United States Patent
Dave et al.

(10) Patent No.: US 8,176,262 B2
(45) Date of Patent: May 8, 2012

(54) HANDLING OF MEMORY ACCESS REQUESTS TO SHARED MEMORY IN A DATA PROCESSING APPARATUS

(75) Inventors: Kinjal Dave, Vinayaka Nagar (IN);
 Saran Kumar Seethapathi, Neyveli (IN); Roma Kundu, Ghaziabad (IN);
 Rahoul Kumar Varma, Cambridge (GB)

(73) Assignee: ARM Limited, Cambridge (GB)

( * ) Notice: Subject to any disclaimer, the term of this patent is extended or adjusted under 35 U.S.C. 154(b) by 455 days.

(21) Appl. No.: 12/385,373

(22) Filed: Apr. 6, 2009

(65) Prior Publication Data
 US 2010/0180085 A1  Jul. 15, 2010

(30) Foreign Application Priority Data
 Jan. 12, 2009 (IN) ............................. 52/DEL/2009

(51) Int. Cl.
 *G06F 12/08* (2006.01)
 *G06F 12/00* (2006.01)
(52) U.S. Cl. . 711/146; 711/147; 711/141; 711/E12.001; 711/E12.033; 711/E12.026

(58) Field of Classification Search .................. 711/146, 711/147, 148
 See application file for complete search history.

(56) References Cited

U.S. PATENT DOCUMENTS

| 2005/0005073 A1* | 1/2005 | Pruvost et al. | 711/148 |
| 2008/0209133 A1* | 8/2008 | Ozer et al. | 711/146 |
| 2010/0064108 A1* | 3/2010 | Harris et al. | 711/146 |

* cited by examiner

*Primary Examiner* — Hoai V Ho
*Assistant Examiner* — Tri Hoang
(74) *Attorney, Agent, or Firm* — Nixon & Vanderhye P.C.

(57) ABSTRACT

A data processing apparatus and method has a plurality of processing units, at least one of which is configured to be switchable between an active power state and a dormant power state and the units share a memory, and at least one local storage unit is configured to store a local copy of a data item stored in the memory for access by an associated processing unit. A snoop control unit is monitors memory access requests and when one is issued, if the control unit has an indication that a local storage unit belonging to another dormant processing unit has a local copy of that data storage item and a cache coherency protocol required that the local copy of the requested data item associated with the other processing unit be invalidated, the control unit stores a marker indicating that that other local copy should later be invalidated.

21 Claims, 6 Drawing Sheets

HANDLING OF MEMORY ACCESS REQUESTS TO SHARED MEMORY IN A DATA PROCESSING APPARATUS

BACKGROUND OF THE INVENTION

1. Field of the Invention

The present invention relates to the handling of memory access requests to shared memory in a data processing apparatus.

2. Description of the Prior Art

It is known to provide a multi-processing system in which two or more processing units, for example processor cores, share access to shared memory. Such systems are typically used to gain higher performance by arranging the different processor cores to execute respective data processing operations in parallel. Known data processing systems which provide such multi-processing capabilities include IBM 370 systems and SPARC multi-processing systems. These particular multi-processing systems are high performance systems where power efficiency and power consumption is of little concern and the main objective is maximum processing speed.

To further improve speed of access to data within such a multi-processing system, it is known to provide each of the processing units with its own local cache in which to store a subset of the data held in the shared memory. Whilst this can improve speed of access to data, it complicates the issue of data coherency. In particular, it will be appreciated that if a particular processor performs a write operation with regards to a data value held in its local cache, that data value will be updated locally within the cache, but may not necessarily also be updated at the same time in the shared memory. This is for example the case if the data value in question relates to a write back region of memory, in which case the updated data value in the cache will only be stored back to the shared memory when that data value is subsequently evicted from the cache.

Since the data may be shared with other processors, it is important to ensure that those processors will access the up-to-date data when seeking to access the associated address in shared memory. To ensure that this happens, it is known to employ a cache coherency protocol within the multi-processing system to ensure that if a particular processor updates a data value held in its local cache, that up-to-date data will be made available to any other processor subsequently requesting access to that data.

In accordance with a typical cache coherency protocol, certain accesses performed by a processor will require a coherency operation to be performed. The coherency operation will cause a notification to be sent to the other processors identifying the type of access taking place and the address being accessed. This will cause those other processors to perform certain actions defined by the cache coherency protocol. One such action is the invalidation of a cached data value, indicating that this data value has become out-of-date due to the actions of the other processors and should not be used. Such a cache coherency protocol may be administered by the provision of a snoop control unit (SCU) which monitors memory access requests issued by each of the processors and causes required actions to be taken by the processors.

In multi-processing systems where power efficiency and power consumption are considered to be important, it is known to provide a multi-processor system in which at least one of the processors is able to enter a lower power state, thus reducing the overall power consumption of the system. An example lower power mode is a dormant mode in which the standard cell logic such as the processor core is powered down completely or at least partially, but sufficient power is still supplied to a local cache within the processor, such that data values stored in that cache are maintained. Whilst this arrangement advantageously allows a multi-processor system to save power by putting processors which are temporarily not required into the dormant power mode, adherence to the cache coherency protocol is further complicated by some of the processors being in a dormant power state.

A possible approach for handling coherency operations whilst allowing some processors to enter a dormant power state involves the SCU causing a dormant processor to return to an active power state (i.e. a power state in which both the processor core and the local cache are powered) when it is required to perform certain actions defined by the cache coherency protocol. Although by this mechanism the cache coherency protocol is respected, if a processor which enters the dormant power state has several shared data items locally stored in its cache, it may be repeatedly returned to its active power state because of other processors issuing memory access requests to those data items, and the power saving benefit of putting this processor into the dormant power state may be significantly diminished. Furthermore, the latency inherent in switching a processor between power states may then result in a significant sum latency due to the repeated power state switches.

Accordingly, it would be desirable to provide a more effective solution for enabling the correct behaviour of processors in a multi-processor system with regard to the cache coherency protocol, whilst retaining the power saving benefits of being able to temporarily put one or more those processors into a dormant power state.

SUMMARY OF THE INVENTION

Viewed from a first aspect, the present invention provides a data processing apparatus comprising: a plurality of processing units, at least one of which is configured to be switchable between an active power state and a dormant power state; a memory shared between said plurality of processing units, each processing unit being configured to issue a memory access request when said processing unit requires access to a data item stored in said memory; at least one local storage unit, each local storage unit being associated with one of said plurality of processing units and being configured to store a local copy of a data item stored in said memory for access by its associated processing unit; and a snoop control unit configured to monitor memory access requests issued by said plurality of processing units and to store in said snoop control unit indications of local copies of data items stored in each local storage unit, wherein said snoop control unit is configured, on detection of a memory access request for a requested data item issued by a first processing unit of said plurality of processing units, to reference said indications and, when an indication of said requested data item corresponding to another processing unit of said plurality of processing units is found, said other processing unit is currently in said dormant power state and a cache coherency protocol requires that the local copy of said requested data item stored in the local storage unit associated with said other processing unit be invalidated, to store in said snoop control unit a marker indicating that the local copy of said requested data item stored in the local storage unit associated with said other processing unit should be later invalidated.

In accordance with the present invention, the ability to maintain coherency between local copies of data items stored in a shared memory without losing the power saving benefits of being able to put a processing unit into a dormant power state is achieved through an adaptation of the snoop control unit, wherein the snoop control unit is configured to be able to store a marker indicating that a local copy of a requested data item stored in the local storage unit associated with a processing unit in the dormant state should be later invalidated. The snoop control unit is then configured, on detection of a memory access request issued by a first processing unit causing that data item to be modified, to reference the indications that the snoop control unit stores regarding which data items are stored in which local storage units, and when necessary, to store a marker indicating that a particular local copy should later be invalidated if that local copy belongs to a processing unit which is currently in the dormant power state.

As a result of this approach, a processing unit may be placed in the dormant power state, without running the risk that it will immediately have to be returned to the active power state in order to service a cache coherency action. The markers stored in the snoop control unit enable the snoop control unit to keep track of local copies of data items in local storage units belonging to processing units in a dormant power state which have become invalid due to actions of the other processing units, and to later cause the required invalidation action to be performed on those local copies.

Accordingly, the present invention provides an elegant and simple solution to the problem of respecting a cache coherency protocol comprising invalidation of local copies stored in local storage units, whilst also retaining the power saving benefits associated with being able to place at least one processing unit into a dormant power state. In doing so, the latency of repeated power state switches is also avoided.

The skilled person will realise that a processing unit of the plurality of processing units could take a variety of forms, for example being a processor core, a graphics processing unit or a DMA. In one embodiment the plurality of processing units comprises two processor cores, each having an associated cache providing its local storage unit.

It will be appreciated that there may be a variety of reasons why the cache coherency protocol may require that the local copy of said requested data item stored in the local storage unit associated with said other processing unit be invalidated. In one embodiment the cache coherency protocol requires that the local copy of said requested data item stored in the local storage unit associated with said other processing unit be invalidated if the memory access request issued by said first processing unit is a write memory access request. Hence, because the memory access request is causing the data item requested to be altered, any previously cached copies become out-of-date. Alternatively, or in addition, the cache coherency protocol may require that the local copy of said requested data item stored in the local storage unit associated with said other processing unit be invalidated if the memory access request issued by said first processing unit is for an exclusive data item. An exclusive data item may only be cached by one local storage unit at a time, so that by storing a copy of that data item in one local storage unit, a copy held in another local storage unit must be invalidated.

In one embodiment the marker comprises a bit appended to the indication of the local copy of the requested data item. The snoop control unit is configured to store indications of local copies of data items stored in each local storage unit, and by having a bit appended to such an indication, the snoop control unit may keep track of those local copies which will later need to be invalidated.

In another embodiment, the marker comprises an entry in an invalidation buffer maintained by the snoop control unit. The provision of an invalidation buffer in the snoop control unit provides a convenient centralised location for storing a limited set of these markers.

In one embodiment the invalidation buffer is configured to store markers for any of said plurality of processing units. Although an invalidation buffer could be provided corresponding to each processing unit, space saving advantages derive from a shared invalidation buffer.

There may be situations in which a processing unit which is about to enter the dormant power state has a local copy of a data item stored in its local storage unit which has been recently modified, without the corresponding data item in the shared memory being updated to match. Hence, in one embodiment before a processing unit is switched into the dormant power state, local copies of data items stored in its associated local storage unit are used to update corresponding data items in the memory, if those local copies have been modified, such a process being referred to as a "cleaning" operation. This procedure enables the processing unit to enter the dormant power state and potentially to remain in that dormant power state for longer, since without this initial cleaning step before entering the dormant state, if access to one of its modified local copies by another requesting processing unit was required, the processing unit would have to return to the active power state in order to perform a coherency operation to make the modified local copy available to the requesting processing unit.

In another embodiment, before a processing unit is switched into the dormant power state, if local copies of data items stored in its associated local storage unit have been modified without updating corresponding data items in the memory, modified data item indicators are stored in the snoop control unit indicating that those local copies have been modified. These modified data item indicators in the snoop control unit thus enable the snoop control unit to recognise when a dormant processing unit is holding a modified local copy of a data item. In order to ensure that memory access requests are not made to an out-of-date data item in the shared memory, in one embodiment the snoop control unit is configured, on detection of a memory access request corresponding to a data item for which a modified data item indicator has been stored, to cause the processing unit associated with the local storage unit storing the modified local copy of that data item to be switched into said active power state and to make the modified local copy available before said memory access request is allowed to proceed. Making the modified local copy available in one embodiment comprises updating said memory with the modified local copy. Alternatively, in another embodiment making the modified local copy available comprises transferring the modified local copy from the local storage unit storing the modified local copy to the local storage unit of the processing unit issuing the memory access request. Providing the modified local copy directly to the requesting processing unit from the processing unit when it has been switched into said active power state allows the servicing of the memory access request without updating the memory at that time.

It will be appreciated that the local storage units could take a variety of forms, but in one embodiment the local storage units are level 1 caches. It will be understood that the local storage units may be accessed in a variety of ways, but in one embodiment the local storage units have associated local storage access circuitry. Whilst in principle the invention could be applied to instruction caches, data caches, or unified caches, in one embodiment the invention is applied in respect of the level 1 data caches.

Those skilled in the art will recognise that the indications stored in the snoop control unit may take a variety of forms, so long as they enable the snoop control unit to identify which data items have local copies stored in which local storage units. Hence, these indications could be memory addresses or other references to memory locations, but in one embodiment the indications of local copies of data items stored in each local storage unit stored in the snoop control unit are TAG portions of the addresses of those data items. TAG portions of addresses are commonly used in caches to identify data items and this convention is, in this embodiment, also made use of in the snoop control unit.

The marker stored in the snoop control unit indicating that a local copy of an access data item in a local storage unit should be later invalidated could be acted upon in various ways. However, in one embodiment the snoop control unit is configured to cause the local copy of said access data item stored in said other local storage unit to be invalidated, in dependence on said marker, when said other processing unit is switched from said dormant power state into said active power state. Thus, by this mechanism, when a processing unit exits the dormant power state and enters the active power state the local copies of data items that it has stored in its local storage unit which have become invalid whilst it was in the dormant power state are updated as such prior to the processor resuming processing in the active power state.

When the marker comprises an entry in an invalidation buffer in the snoop control unit, the contents of that invalidation buffer may be acted upon in a variety of ways. In one embodiment the snoop control unit is configured to cause the local copy of said requested data item stored in said other local storage unit to be invalidated when a predetermined number of entries in said invalidation buffer is reached. In one embodiment the predetermined number of entries in said invalidation buffer is programmable. This predetermined number may naturally be chosen in dependence on the particular system requirements, but in one embodiment the predetermined number of entries in the invalidation buffer is a maximum number of entries in the invalidation buffer. Hence, when the invalidation buffer is full the buffered entries therein may be acted upon.

In one embodiment, the data processing apparatus further comprises a flag storage, the snoop control unit being configured to set a flag in said flag storage if at least one marker is stored in said snoop control unit. Hence, when a processing unit exits the dormant power state, by reference to this flag it can be easily established if any invalidation actions are required before that processing unit can resume processing.

Viewed from a second aspect, the present invention provides a method of managing a data processing apparatus, said data processing apparatus comprising: a plurality of processing units, at least one of which is configured to be switchable between an active power state and a dormant power state; a memory shared between said plurality of processing units, each processing unit being configured to issue a memory access request when it requires access to a data item stored in said memory; at least one local storage unit, each local storage unit being associated with one of said plurality of processing units and being configured to store a local copy of a data item stored in said memory for access by its associated processing unit; and a snoop control unit configured to monitor memory access requests issued by said plurality of processing units and to store in said snoop control unit indications of local copies of data items stored in each local storage unit, said method comprising the steps of: detecting a memory access request for a requested data item issued by a first processing unit of said plurality of processing units; referencing said indications for an indication of said requested data item corresponding to another processing unit of said plurality of processing units, wherein said other processing unit is currently in said dormant power state; determining whether a cache coherency protocol requires that the local copy of said requested data item stored in the local storage unit associated with said other processing unit be invalidated; and in dependence on said determining step, storing in said snoop control unit a marker indicating that the local copy of said requested data item stored in the local storage unit associated with said other processing unit should be later invalidated.

Viewed from a third aspect, the present invention provides a data processing apparatus comprising: a plurality of means for processing, at least one of which is configured to be switchable between an active power state and a dormant power state; a memory means for storing data items, said memory means shared between said plurality of means for processing, each means for processing being configured to issue a memory access request when it requires access to a data item stored in said memory means; at least one local storage means, each local storage means being associated with one of said plurality of means for processing and each local storage means being means for storing a local copy of a data item stored in said memory means for access by its associated means for processing; and a snoop control means for monitoring memory access requests issued by said plurality of means for processing and for storing in said snoop control means indications of local copies of data items stored in each local storage means, wherein said snoop control means is configured, on detection of a memory access request for a requested data item issued by a first means for processing of said plurality of means for processing, to reference said indications and, when an indication of said requested data item corresponding to another means for processing of said plurality of means for processing is found, and said other means for processing is currently in said dormant power state and a cache coherency protocol requires that the local copy of said requested data item stored in the local storage means associated with said other means for processing be invalidated, to store in said snoop control means a marker indicating that the local copy of said requested data item stored in the local storage means associated with said other means for processing should be later invalidated.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
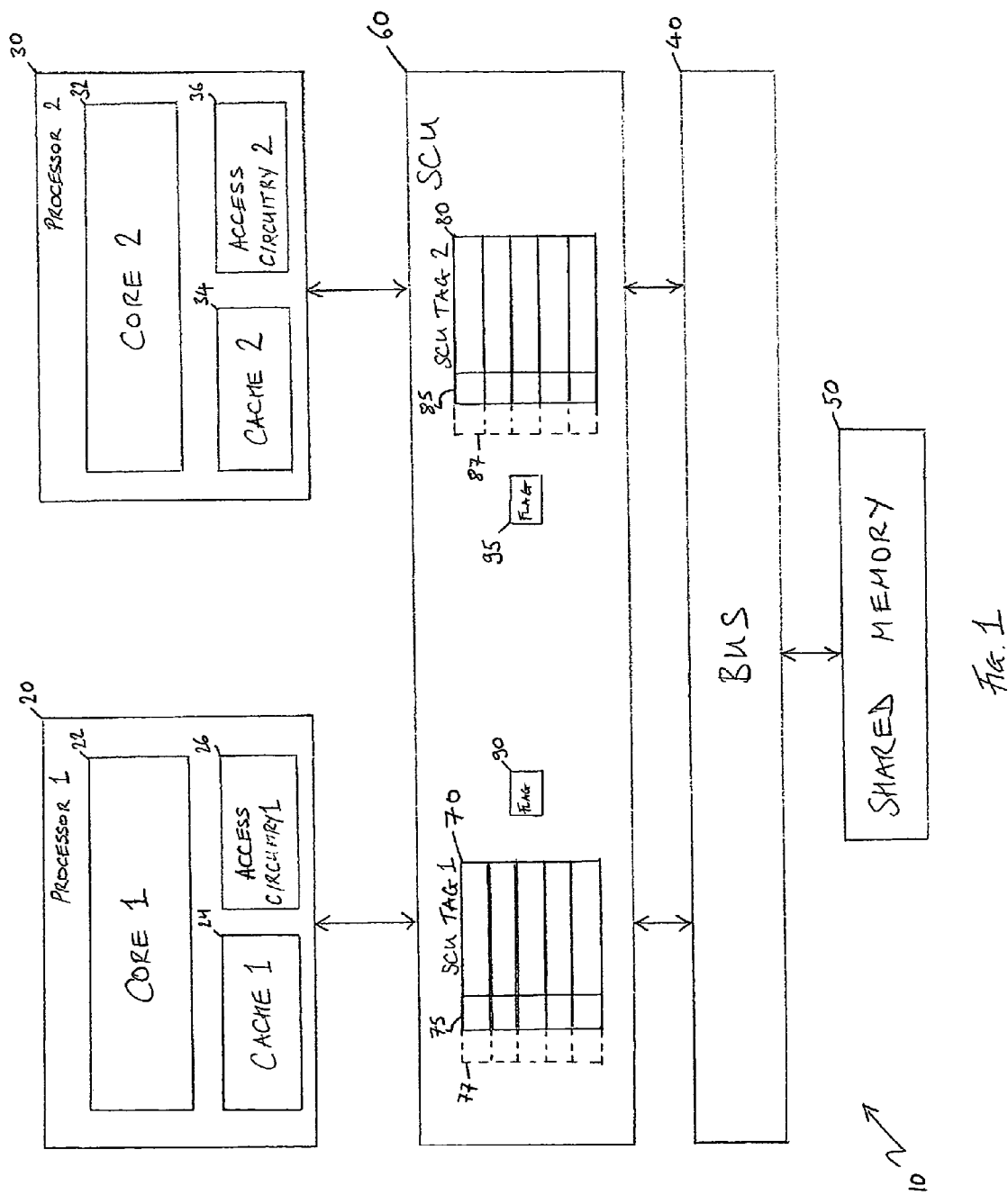
FIG. 1 is a block diagram of a data processing apparatus in accordance with a first embodiment of the present invention.

FIG. 1 is a block diagram of a data processing apparatus 10 accordingly to a first embodiment of the present invention, comprising multiple processors 20, 30 which are coupled via a bus 40 with a shared memory region 50. Each of the processors 20, 30 comprises a processor core 22, 32 coupled with an associated local cache 24, 34, respectively, each cache being used to store a subset of the data held in shared memory 50 in order to increase speed of access to that data by the associated processor. Each cache is accessed via access circuitry 26, 36 respectively. It will be appreciated that the level 1 caches 24, 34 may be unified caches storing instructions and data values, or alternatively may actually comprise a separate instruction cache and data cache. In this latter example, the instruction cache will typically not be subjected to snoop operations as instructions are not typically modified, and instead the techniques of embodiments of the present invention will only typically be applied in respect of the contents of the data cache. Hence, in such embodiments, the caches 24, 34 can be viewed as representing the level 1 data caches with the level 1 instruction caches omitted for clarity.

It should be noted from the outset that the techniques of the present invention are equally applicable to multi-processor systems comprising more than two processors, but in the interest of clarity, multi-processor system 10 is illustrated with only two processors.

The processors 20, 30 are connected to bus 40 via snoop control unit (SCU) 60. The SCU is used to apply a cache coherency protocol in order to ensure that the data held in the local caches 24, 34 is kept up-to-date.

The memory 50 may be entirely formed as a shared memory, or alternatively may be viewed as consisting of a number of memory regions, with at least one of those regions being a shared memory region in which the processors 20, 30 can store data that is sharable amongst those processors.

Further, in the illustrated embodiment where the caches 24, 34 are level 1 caches, the element 50 can be considered to include any intervening levels of cache (such as a unified level 2 cache) between the level 1 caches and the shared memory itself, and the term "shared memory" will be used herein where appropriate to refer not only to the memory itself but also to any such intervening levels of cache.

The administration of the cache coherency protocol by the SCU is facilitated by the provision of SCU TAG storage areas 70, 80. When a data item from the shared memory 50 is stored in one of the caches 24, 34, the SCU stores the corresponding TAG (a portion of the data item's memory address) in the appropriate SCU TAG storage area. Essentially, each SCU TAG storage area is a replica of the TAG storage in the corresponding cache. If the cache is, for example, a 4-way set associative cache, then the corresponding SCU TAG storage area will store copies of the TAGS stored in each of the four ways. Furthermore the index of a cached item corresponds to the index of the corresponding TAG in the SCU TAG storage area. SCU TAG storage area 70 is associated with cache 24 and SCU TAG storage area 80 is associated with cache 34. Hence, when one of the processors 20, 30 issues a memory access request for a data item in the shared memory region 50, the SCU 60 can reference the SCU TAG storage areas to ascertain if a local copy of that data item is currently stored in the cache associated with the other processor.

Processors 20, 30 are configured to be switchable between an active power state and a dormant power state. In the active power state, the processor is fully powered, but in the dormant power state the core and access circuitry are powered down, leaving only the cache with sufficient power to maintain its state.

In the situation where the SCU identifies a memory access request for a data item stored in the shared memory 50, and the SCU TAG storage area corresponding to the other processor has a TAG stored therein matching the TAG portion of the address of that data item, then if the other processor is currently in the dormant power state the SCU is configured to modify a bit appended to the corresponding TAG. This bit then serves as a marker indicating that the local copy of that data item stored in the cache associated with the other processing unit should be later invalidated. For example, if processor 20 issues a memory access request for a data item stored in shared memory 50 and the SCU identifies that the corresponding TAG is stored in an entry of the SCU TAG storage area 80, and processor 30 is currently in the dormant power state, the SCU modifies the bit appended to the TAG in SCU TAG storage area 80. Each of the SCU TAG storage areas 70, 80 is provided with an additional set of storage locations 75, 85 for storing these bits. When processor 2 later exits the dormant power state and enters the active power state the SCU 60 is configured to reference SCU TAG storage area 80 and, if any of the TAGs stored therein have a relevant bit stored in storage area 85, to cause the corresponding local copies stored in cache 34 to be invalidated before processor 30 resumes processing in the active power state. In the illustrated embodiment each SCU TAG storage area has an associated flag storage 90 and 95, respectively. Flag 90 is set if any of the TAGs stored in SCU TAG storage area 70 have a relevant bit stored in storage area 75 indicating a required invalidation. Similarly, flag 95 is set if any of the TAGs stored in SCU TAG storage area 80 have a relevant bit stored in storage area 85 indicating a required invalidation. Referencing these flags enables the SCU 60 to quickly establish if any invalidation actions are required before the corresponding processor can resume processing. The invalidation process takes place by stepping through the relevant SCU TAG storage area and triggering invalidations via cache maintenance operations performed by the access circuitry 26,36 in dependence on the content of the storage areas 75 and 85. These cache maintenance operations make use of the way and index information duplicated in the SCU TAG storage areas to access the local copies cached in caches 24 and 34.

Before one of the processors 20, 30 enters the dormant power state any local copies of data items stored in the corresponding cache 24, 34 that have been marked as "dirty", i.e. they have been modified in that cache without updating the shared memory 50, are used to update the corresponding data items in the memory before the processor is switched into the dormant power state.

In an alternative embodiment, the SCU TAG storage areas 70, 80 further comprise dirty data item indicator storage areas 77, 87. These are used if a processor is switched into the dormant power state without at least one of the modified local copies stored in the associated cache being used to update the shared memory. In this case a dirty bit is set in the corresponding entry of dirty data item indicator storage area 77, 87. Then, if the SCU identifies a memory access request from, say, processor 20 referring to a data item the TAG of which is stored in SCU TAG storage area 80 and the dirty bit of which is set in the corresponding entry of dirty indicator storage area 87, the SCU will cause processor 30 to be switched into the active power state and update the shared memory 50 with the modified copy of the data item stored in cache 34 before that memory access request is allowed to proceed. Alternatively, processor 30 can, once in the active power state, cause the modified copy of the data item (along with any status bits such as the dirty bit) stored in cache 34 to be provided directly to the processor 1 (via its local cache 24 if appropriate) rather than an update being made to shared memory 50.

Figure 2:
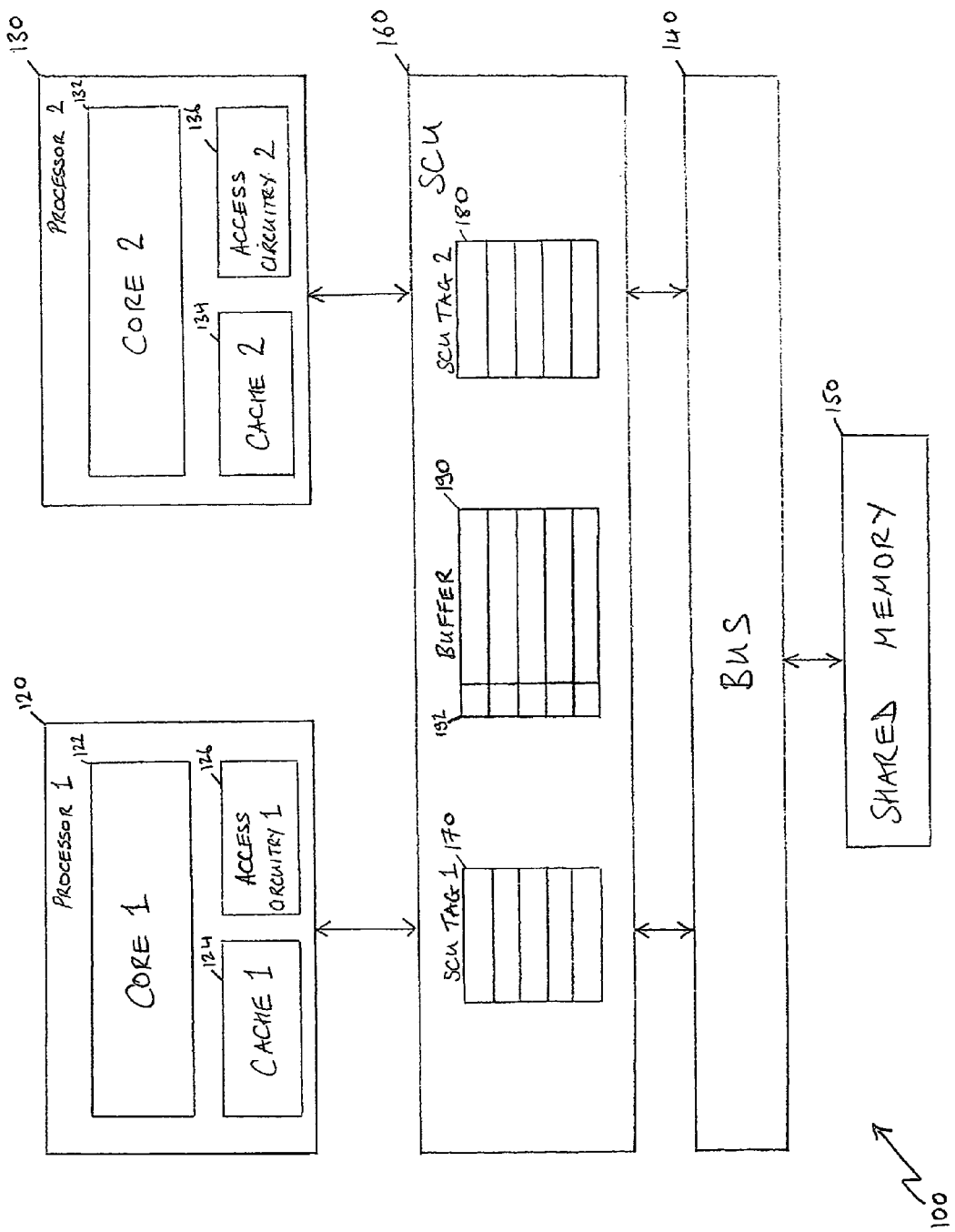
FIG. 2 is a block diagram of a data processing apparatus in accordance with a second embodiment of the present invention.

FIG. 2 is a block diagram of a data processing apparatus 100 according to a second embodiment of the present invention. Here, processors 120, 130 are configured in the same way as processors 20, 30 in FIG. 1 (as are cores 122, 132, caches 124, 134 and access circuitry 126, 136). Similarly, bus 140 and shared memory 150 correspond to bus 40 and shared memory 50 in FIG. 1. The operation of processors 120, 130, bus 140 and shared memory 150 are thus not described in detail here.

In this embodiment SCU 160 is configured slightly differently. As in FIG. 1 SCU 160 comprises SCU TAG storage areas 170 and 180 which store the TAG portions of data items which have been cached in caches 124, 134. In this embodiment SCU 160 is further provided with invalidation buffer 190. Each entry of invalidation buffer 190 is used by SCU 160 to store a marker indicating that a local copy stored in one of the caches 124, 134 must be invalidated when the corresponding processor 120, 130 exits the dormant power state. Since this buffer is shared, i.e. an entry in the buffer could refer to either processor, a column 192 of the buffer is provided into which an indication of the corresponding processor can be stored. For example, when an entry is made in invalidation buffer 190 pertaining to a local copy stored in cache 124 the corresponding entry in column 192 will indicate that this entry refers to processor 120 and cache 124. The SCU 160 is configured to continue adding entries to invalidation buffer 190 until a predetermined number of entries is reached, in this embodiment that predetermined number of entries being the maximum number of entries that the invalidation buffer can store (naturally the largest size that this invalidation buffer could need to be is determined by the number of processing units, the number of ways in the caches, and the index array sizes (i.e. the number of TAG entries per way)). Alternatively, this predetermined number of entries could be specified by the user or by software.

When the predetermined number of entries is reached, the SCU 160 is configured to wake up the dormant processor. Note that with only two processors, for any entries to be made in the invalidation buffer 190 only one of the processors can be in the dormant power state, since the other processor must be in the active power state to be generating entries to go in the invalidation buffer (and for this reason, with only two processors, the indication in column 192 is not strictly required). However with three or more processors, more than one could be in the dormant power state, and the SCU could for example be configured to only wake one processor, or could be configured to wake all processors with pending invalidations. A counter could be provided alongside the invalidation buffer to store the number of invalidations per processing unit. Alternatively, or in addition, the determination of when to wake up which processing unit could be performed in software. The SCU 160 then causes the buffered invalidations stored in the invalidation buffer 190 to be carried out in the just re-awakened processor. These invalidation operations are carried out by making use of the way and index information stored for each entry in the invalidation buffer 190 (see below with reference to FIGS. 3 and 4).

Figure 3:
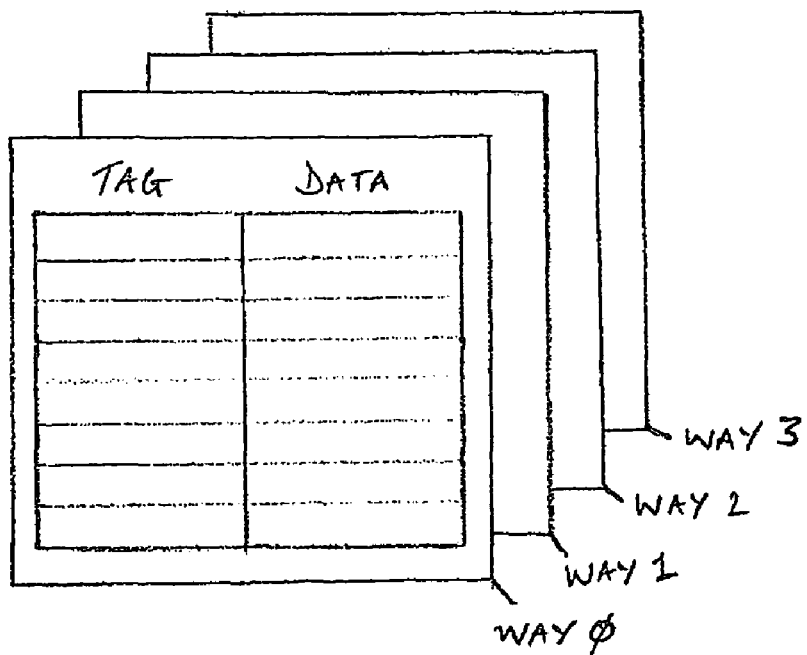
FIG. 3 is a block diagram of a set associative cache in accordance with one embodiment of the present invention.
Figure 4:
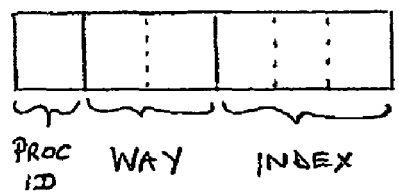
FIG. 4 schematically illustrates the format of a buffer entry in accordance with the second embodiment of the present invention.

The format of the invalidation buffer of FIG. 2 is now described in more detail with reference to FIGS. 3 and 4. As illustrated in FIG. 3, each of the caches 124 and 134 is (in this embodiment) a 4-way set associative cache. Thus, when accessing the cache (by means of cache access circuitry 126 and 136 respectively) the index part of a requested data item's address is used to identify a set (i.e. one entry per way) and then TAG comparisons are performed within that set to identify whether the requested data item is located in the cache. Within the invalidation buffer the entries have a format as illustrated in FIG. 4, namely divided into processor ID, way and index information. The processor ID bits of each entry form the column 192 in FIG. 2. Hence on the basis of the information stored in each entry of the invalidation buffer, the entries in each cache that need invalidating can be identified by the associated access circuitry.

Figure 5:
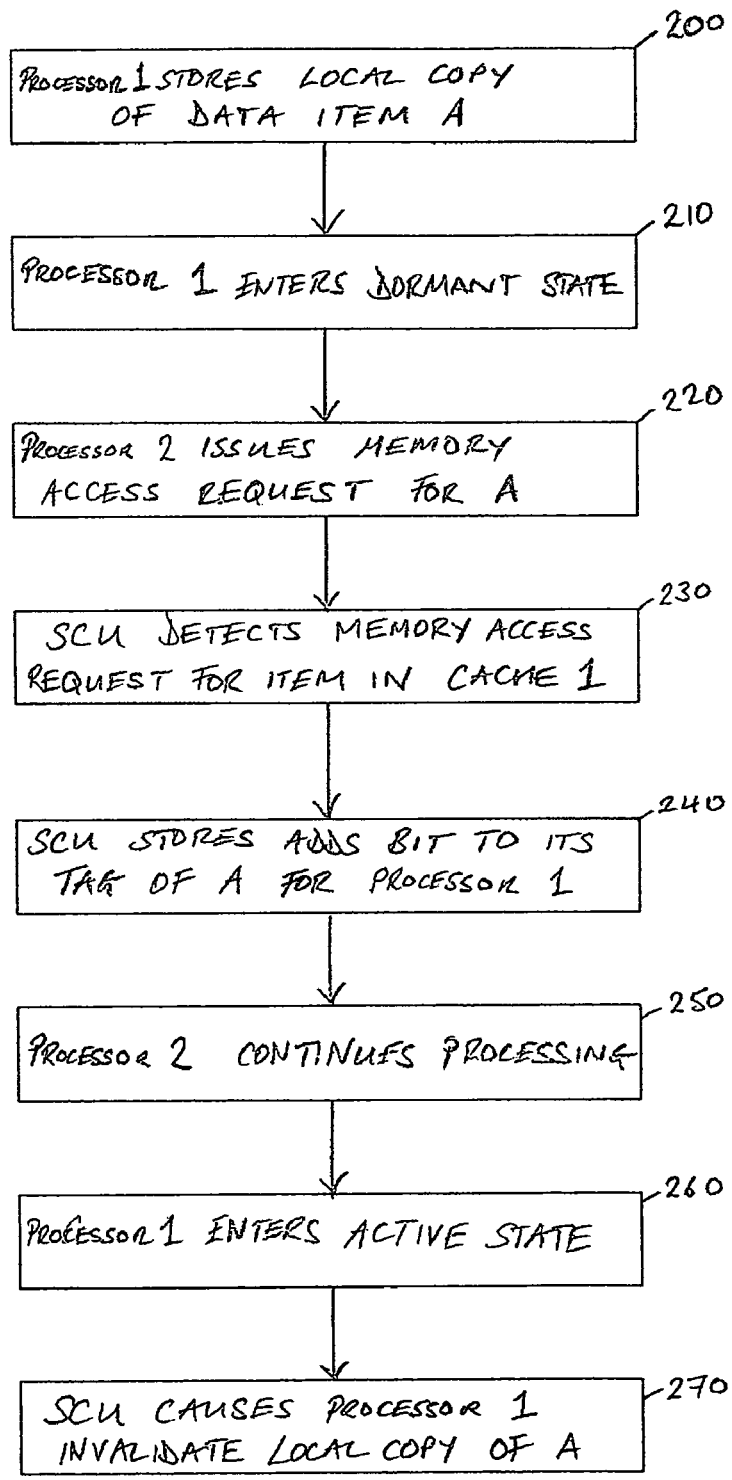
FIG. 5 is a flow diagram illustrating a series of steps occurring in a data processing apparatus in accordance with one embodiment of the present invention.

FIG. 5 illustrates a series of steps that may occur in an embodiment of the present invention such as that illustrated in FIG. 1. First at step 200 processor 1 stores a local copy of data item A in cache 1. Then at step 210 processor 1 enters the dormant power state. Next at step 220 processor 2 issues a memory access request for data item A and at step 230 the SCU detects the memory access request for an item that has previously been cached in cache 1. The SCU at step 240 then adds a bit to the TAG that it has stored for data item A in a storage area corresponding to processor 1. Processor 2 (step 250) continues processing. At some later stage (step 260) processor 1 exits the dormant power state and enters the active power state. When this happens the SCU causes processor 1 to invalidate its local copy of data item A stored in cache 1 (step 270).

Figure 6:
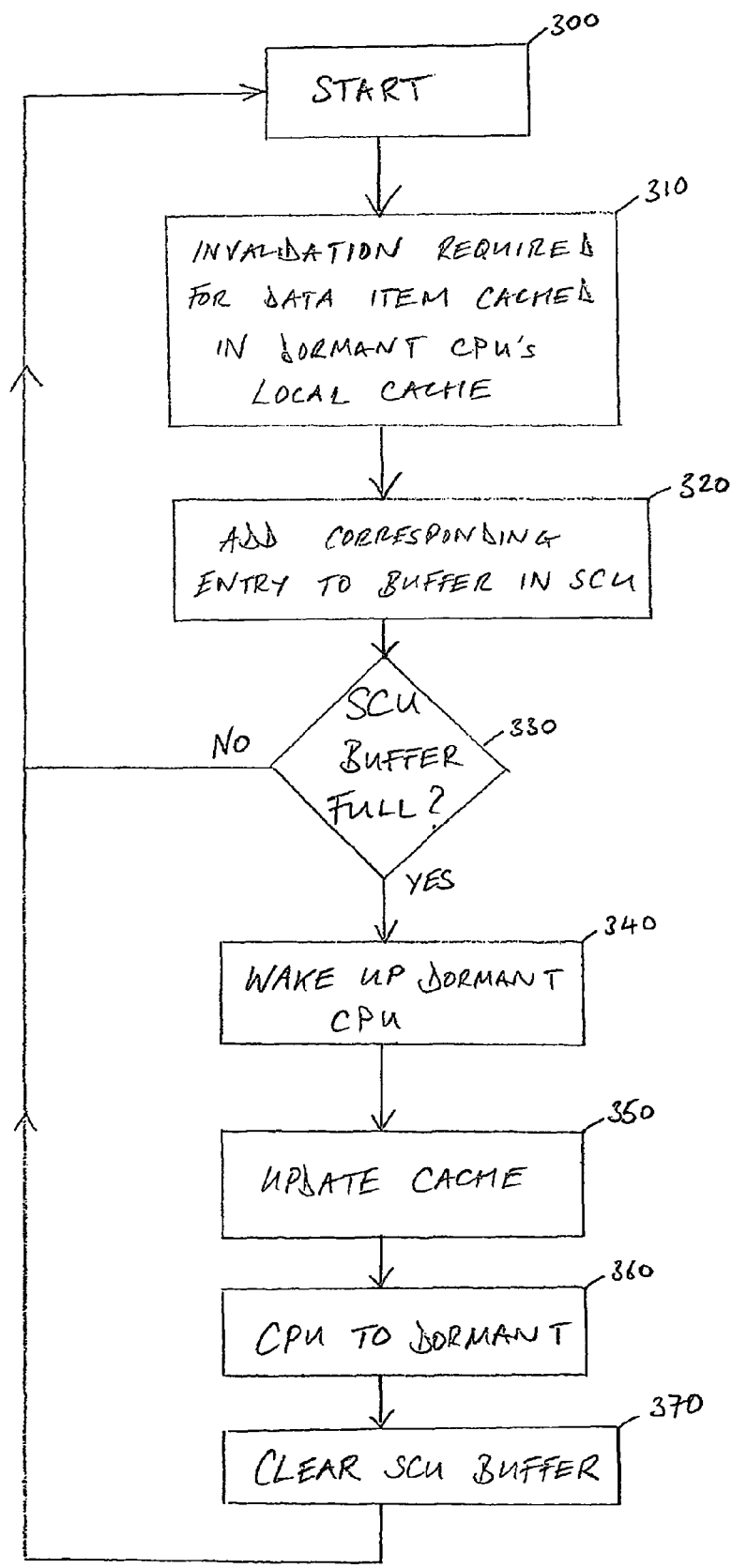
FIG. 6 is a flow diagram illustrating a series of steps occurring in a data processing apparatus in accordance with another embodiment of the present invention.

FIG. 6 illustrates a series of steps that may occur in a data processing apparatus according to the embodiment illustrated in FIG. 2. The flow starts at step 300 and proceeds to step 310, where it is established by the SCU that invalidation will be required for a data item cached in a dormant CPU's local cache. Hence, at step 320 the SCU adds a corresponding entry to the invalidation buffer 190 in the SCU. If at step 330 the invalidation buffer 190 in SCU 160 is not yet full then the flow returns to step 300 for further invalidation requests to be buffered as they occur. However, if the SCU buffer 190 is full, then flow proceeds to step 340 where the SCU causes the dormant CPU to be "woken up", i.e. returned to the active power state. The cache of that CPU is then correspondingly updated at step 350 and at step 360 (assuming that this CPU is still not required to be active) it is returned to the dormant power state. The invalidation buffer 190 in SCU 160 is cleared (step 370) and the flow returns to step 300.

Figure 7:
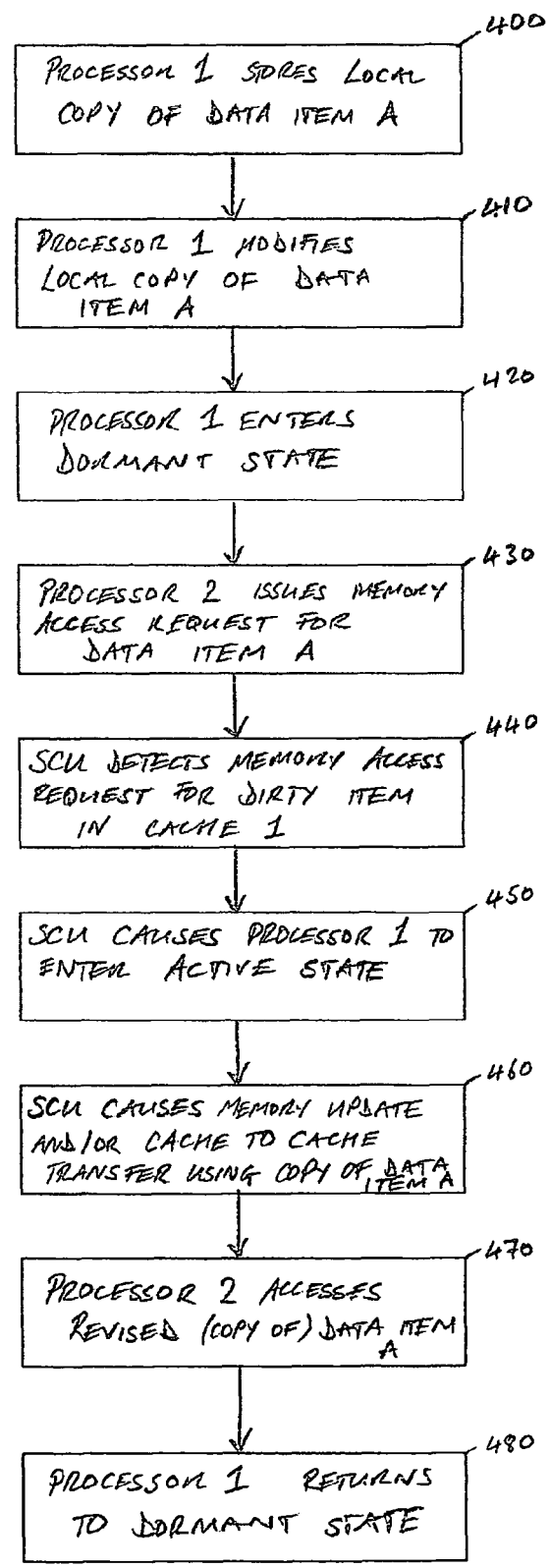
FIG. 7 is a flow diagram illustrating a series of steps occurring in a data processing apparatus in accordance with one embodiment of the present invention.

FIG. 7 illustrates another series of steps that may occur in an embodiment of the present invention such as that illustrated in FIG. 1. First at step 400 processor 1 stores a local copy of data item A in cache 1. Then at step 410 processor 1 modifies its locally stored copy of data item A and at step 420 it enters the dormant power state. Next at step 430 processor 2 issues a memory access request for data item A and at step 440 the SCU detects the memory access request for an item that has previously been cached in cache 1 and (by reference to the dirty item storage indicator area 77) that the copy cached in cache 1 is dirty. The SCU at step 450 then causes processor 1 to enter the active power state, such that at step 460 the SCU can cause a memory update and/or a direct cache-to-cache transfer using the version of data item A stored in cache 1. Processor 2 (step 470) then continues processing, making use of the revised data item A, either from its own cache 2 or from memory. Processor 1 returns to the dormant power state (step 480).

From the above description, it will be appreciated that the above described embodiments of the present invention provide a convenient implementation for ensuring that the correct behaviour according to a cache coherency protocol for a shared memory is carried out, without losing the benefits of being able to put one of the processors of the multi-processor system into a dormant power state.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus comprising:
   a plurality of processing units, at least one of which is configured to be switchable between an active power state and a dormant power state;
   a memory shared between said plurality of processing units, each processing unit being configured to issue a memory access request when said processing unit requires access to a data item stored in said memory;
   at least one local storage unit, each local storage unit being associated with one of said plurality of processing units and being configured to store a local copy of a data item stored in said memory for access by its associated processing unit; and
   a snoop control unit configured to monitor memory access requests issued by said plurality of processing units and to store indications of local copies of data items stored in each local storage unit,
   wherein said snoop control unit is configured, on detection of a memory access request for a requested data item issued by a first processing unit of said plurality of processing units, to reference said indications and, when an indication of said requested data item corresponding to another processing unit of said plurality of processing units is found, said other processing unit is currently in said dormant power state and a cache coherency protocol requires that the local copy of said requested data item stored in the local storage unit associated with said other processing unit be invalidated, to store a marker indicating that the local copy of said requested data item stored in the local storage unit associated with said other processing unit should be later invalidated.

2. A data processing apparatus as claimed in claim 1, wherein the cache coherency protocol requires that the local copy of said requested data item stored in the local storage unit associated with said other processing unit be invalidated if the memory access request issued by said first processing unit is a write memory access request.

3. A data processing apparatus as claimed in claim 1, wherein the cache coherency protocol requires that the local copy of said requested data item stored in the local storage unit associated with said other processing unit be invalidated if the memory access request issued by said first processing unit is for an exclusive data item.

4. A data processing apparatus as claimed in claim 1, wherein said marker comprises a bit appended to the indication of the local copy of the requested data item.

5. A data processing apparatus as claimed in claim 1, wherein said marker comprises an entry in an invalidation buffer maintained by said snoop control unit.

6. A data processing apparatus as claimed in claim 5, wherein said invalidation buffer is configured to store markers for any of said plurality of processing units.

7. A data processing apparatus as claimed in claim 1, wherein, before a processing unit is switched into said dormant power state, local copies of data items stored in its associated local storage unit are used to update corresponding data items in the memory, if those local copies have been modified.

8. A data processing apparatus as claimed in claim 1, wherein, before a processing unit is switched into said dormant power state, if local copies of data items stored in its associated local storage unit have been modified without updating corresponding data items in the memory, modified data item indicators are stored in the snoop control unit indicating that those local copies have been modified.

9. A data processing apparatus as claimed in claim 8, wherein said snoop control unit is configured, on detection of a memory access request corresponding to a data item for which a modified data item indicator has been stored, to cause the processing unit associated with the local storage unit storing the modified local copy of that data item to be switched into said active power state and to make the modified local copy available before said memory access request is allowed to proceed.

10. A data processing apparatus as claimed in claim 9, wherein making the modified local copy available comprises updating said memory with the modified local copy.

11. A data processing apparatus as claimed in claim 9, wherein making the modified local copy available comprises transferring the modified local copy from the local storage unit storing the modified local copy to the local storage unit of the processing unit issuing the memory access request.

12. A data processing apparatus as claimed in claim 1, wherein said at least one local storage unit is a level 1 cache.

13. A data processing apparatus as claimed in claim 1, wherein said at least one local storage unit each has associated local storage access circuitry.

14. A data processing apparatus as claimed in claim 1, wherein said indications of local copies of data items stored in each local storage unit stored in said snoop control unit are TAG portions of the addresses of those data items.

15. A data processing apparatus as claimed in claim 1, wherein said snoop control unit is configured to cause the local copy of said requested data item stored in said other local storage unit to be invalidated, in dependence on said marker, when said other processing unit is switched from said dormant power state into said active power state.

16. A data processing apparatus as claimed in claim 5, wherein said snoop control unit is configured to cause the local copy of said requested data item stored in said other local storage unit to be invalidated when a predetermined number of entries in said invalidation buffer is reached.

17. A data processing apparatus as claimed in claim 16, wherein said predetermined number of entries in said invalidation buffer is programmable.

18. A data processing apparatus as claimed in claim 16, wherein said predetermined number of entries in said invalidation buffer is a maximum number of entries in said invalidation buffer.

19. A data processing apparatus as claimed in claim 1, further comprising a flag storage, the snoop control unit being configured to set a flag in said flag storage if at least one marker is stored in said snoop control unit.

20. A method of managing a data processing apparatus, said data processing apparatus comprising:
    a plurality of processing units, at least one of which is configured to be switchable between an active power state and a dormant power state;
    a memory shared between said plurality of processing units, each processing unit being configured to issue a memory access request when said processing unit requires access to a data item stored in said memory;

at least one local storage unit, each local storage unit being associated with one of said plurality of processing units and being configured to store a local copy of a data item stored in said memory for access by its associated processing unit; and a snoop control unit configured to monitor memory access requests issued by said plurality of processing units and to store indications of local copies of data items stored in each local storage unit, said method comprising the steps of:

detecting a memory access request for a requested data item issued by a first processing unit of said plurality of processing units;

referencing said indications for an indication of said requested data item corresponding to another processing unit of said plurality of processing units, wherein said other processing unit is currently in said dormant power state;

determining whether a cache coherency protocol requires that the local copy of said requested data item stored in the local storage unit associated with said other processing unit be invalidated; and in dependence on said determining step, storing in said snoop control unit a marker indicating that the local copy of said requested data item stored in the local storage unit associated with said other processing unit should be later invalidated.

21. A data processing apparatus comprising:

a plurality of means for processing, at least one of which is configured to be switchable between an active power state and a dormant power state;

a memory means for storing data items, said memory means shared between said plurality of means for processing, each means for processing being configured to issue a memory access request when it requires access to a data item stored in said memory means;

at least one local storage means, each local storage means being associated with one of said plurality of means for processing and each local storage means being means for storing a local copy of a data item stored in said memory means for access by its associated means for processing; and a snoop control means for monitoring memory access requests issued by said plurality of means for processing and for storing indications of local copies of data items stored in each local storage means, wherein said snoop control means, on detection of a memory access request for a requested data item issued by a first means for processing of said plurality of means for processing, for referencing said indications and, when an indication of said requested data item corresponding to another means for processing of said plurality of means for processing is found, said other means for processing is currently in said dormant power state and a cache coherency protocol requires that the local copy of said requested data item stored in the local storage means associated with said other means for processing be invalidated, for storing a marker indicating that the local copy of said requested data item stored in the local storage means associated with said other means for processing should be later invalidated.

* * * * *